(12) United States Patent
He et al.

(10) Patent No.: US 7,869,050 B2
(45) Date of Patent: Jan. 11, 2011

(54) SYSTEMS AND METHODS FOR COMPARATIVE INTERFEROGRAM SPECTROMETRY

(75) Inventors: George G. He, Fredericksburg, VA (US); Diane E. Deterline, Fredericksburg, VA (US)

(73) Assignee: Eoir Technologies, Inc., Fredericksburg, VA (US)

( * ) Notice: Subject to any disclaimer, the term of this patent is extended or adjusted under 35 U.S.C. 154(b) by 0 days.

(21) Appl. No.: 12/540,986

(22) Filed: Aug. 13, 2009

(65) Prior Publication Data

US 2009/0296097 A1 Dec. 3, 2009

Related U.S. Application Data

(63) Continuation of application No. 11/542,465, filed on Oct. 2, 2006, now Pat. No. 7,593,112.

(51) Int. Cl.
*G01B 9/02* (2006.01)
*G01J 3/45* (2006.01)

(52) U.S. Cl. .................................................... 356/451
(58) Field of Classification Search ................ 356/300, 356/450, 451, 456
See application file for complete search history.

(56) References Cited

U.S. PATENT DOCUMENTS 5,982,486 A 11/1999 Wang
6,714,304 B2 3/2004 Ota
2005/0275847 A1 12/2005 Moshe
2006/0232781 A1 10/2006 Kranz et al.

OTHER PUBLICATIONS

Hsu, Sherman; "Infrared Spectroscopy"; Handbook of Instrumental Techniques for Analytical Chemistry (Frank A. Settle, ed.); Jun. 14, 1997; Chapter 15; Prentice Hall; USA.
Kroutil, Robert et al.; "Emergency Response Chemical Detection Using Passive Infrared Spectroscopy"; SPIE Newsroom; 2006; The Intermation Society for Optical Engineering.
"Technical Information SD-12 Characteristics and use of Infrared Detectors"; Hamamatsu Photonics K.K., Solid State; Nov. 2004; pp. 1-43; Japan.
Gat, Nahum et al.; "Chemical Detection Using the Airborne Thermal Infrared Imaging Spectrometer (TIRIS)"; DPIE Conference 3082; Monday, Apr. 21, 1997; pp. 1-10.
Harig, Roland et al.; "Toxic Cloud Imaging by Infrared Spectrometry: A Scanning FTIR System for Identification and Visualization"; 2001; Field Analytical Chemistry and Technology; Hamburg-Har Germany.

*Primary Examiner*—Michael A Lyons
(74) *Attorney, Agent, or Firm*—Steven L. Nichols; Van Cott, Bagley, Cornwall & McCarthy PC

(57) ABSTRACT

A method for determining a background noise level includes receiving interferogram data; determining at least one measure of interferogram quality; accumulating said received interferogram data; and generating a background noise level based on said interferogram data and at least one measure of interferogram quality.

21 Claims, 9 Drawing Sheets

SYSTEMS AND METHODS FOR COMPARATIVE INTERFEROGRAM SPECTROMETRY

RELATED APPLICATIONS

The present application is a continuation and claims the priority under 35 U.S.C. §120 of U.S. patent application Ser. No. 11/542,465, filed Oct. 2, 2006, entitled "Systems and Methods for Comparative Interferogram Spectrometry," which application is currently allowed and is incorporated herein by reference in its entirety.

BACKGROUND

Remote chemical identification is an increasingly important tool for environmental agencies, military groups, manufacturers, and other organizations. Many chemical plants, manufacturing plants, water utilities, military bases, and other facilities use and store hazardous chemicals. In the event that chemicals are released, it is desirable to identify the chemicals and assess the threat from a distance. Ideally, potentially hazardous chemicals should be identified without exposing human investigators to the chemicals. Remote identification, known as stand-off detection, can be effective over a large area and may be used in a variety of ambient conditions.

Conventional stand-off chemical identification systems traditionally employ Fourier transform infrared (FTIR) spectroscopy to identify chemicals in the atmosphere. FTIR spectroscopy, however, is sensitive to noise and performs poorly in changing background conditions. The computational demands of Fourier transform analysis also slow the analysis process. Furthermore, the Fourier transform removes valuable information from interferogram data and limits the precision of the analysis. Additionally, many FTIR systems require blackbody radiation sources and other expensive hardware for calibration.

SUMMARY

A system for comparative interferogram spectrometry includes an interferometer configured to generate interferograms from incident radiation from a target region, an interferogram database containing stored interferograms, and a processing subsystem configured to receive the generated interferograms and compare the received interferograms to the stored interferograms.

BRIEF DESCRIPTION OF THE DRAWINGS

The accompanying drawings illustrate various embodiments of the principles described in this specification and are a part of the specification. The illustrated embodiments are merely examples and do not limit the scope of the principles described herein.

Throughout the drawings, identical reference numbers designate similar, but not necessarily identical, elements.

DETAILED DESCRIPTION

Figure 1:
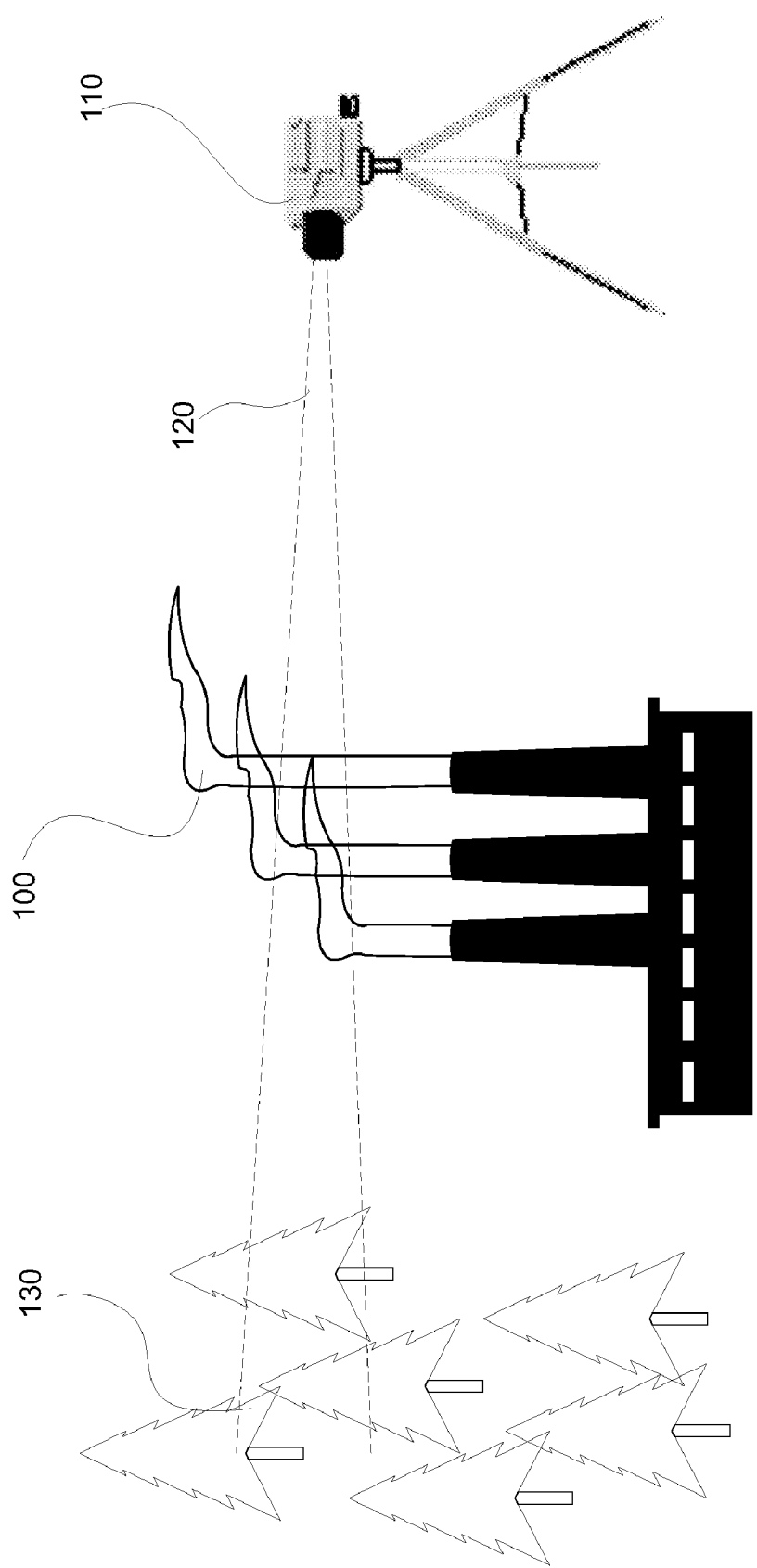
FIG. 1 is a diagram illustrating a typical use for a comparative interferogram spectrometry system, according to one exemplary embodiment.

Various exemplary methods and systems for comparative interferogram spectrometry (CIS) are described herein. CIS systems analyze interferogram data rather than spectral data. Consequently, CIS systems benefit from information that spectral approaches normally eliminate with a Fourier transform. Using comparative information theory and the interferogram partitioning principle, CIS can identify chemical signatures from a distance without blackbody calibration or artificial light sources. As will be explained in greater detail below, comparative information theory (CIT) enables high sensitivity comparisons of interferograms using the ratio of interferograms. The sensitivity of a CIS system is further enhanced by calculating CIT ratios from composite interferograms which incorporate information from multiple measurements. Application of the interferogram partitioning principle (IPP) enables a CIS system to exclude noisy sections of an interferogram from analysis that would be inextricable from spectral analysis. The excellent sensitivity of CIS can also be used to characterize the performance and stability of measurement instruments.

As used herein and in the appended claims, the term "target region" is defined to include any location, area, or region of measurement within the optical path of the interferometer which contributes to the light received and consequently the interferogram generated.

As used herein and in the appended claims, the term "composite interferogram" is defined to include any interferogram that contains information describing, derived from, or representing at least two interferograms. Each component interferogram contributing to a composite interferogram need not contribute an equal amount or type of information. Additionally, a composite interferogram may contain only a portion of the information contained in its component interferograms. Furthermore, the initial information contributed to form a composite interferogram need not be separable from the composite interferogram. Composite interferograms may be created by processes including, but not limited to, summation, integration, piecewise construction, ratio of interferograms, and additional physical and mathematical operations.

As used herein and in the appended claims, the term "scaling" is defined to include the alteration of one or more characteristics of a data set. For a two dimensional interferogram, for example, scaling may include, but is not limited to, expansion or compression along the horizontal axis, vertical axis, both axes, or a portion or either or both axes. Scaling may include normalizing a data set so that the maximum or minimum intensity is the same across the multiple measurements. Scaling may also adjust one or more interferograms to achieve a certain value or range of values of width, area, shape, ratio, and other characteristics. Scaling may adjust a data set so that relative intensities or other characteristics are preserved even though other properties are altered.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

As illustrated in FIG. 1, a CIS system may be used to remotely identify chemicals (100) in the atmosphere. A CIS system (110) may detect waves emitted, reflected, transmitted, or otherwise propagated to the CIS system (110) from released chemicals (100) and a background (130). According to one embodiment, the CIS system (110) may be configured for stationary use or may be installed in a vehicle or other mobile platform.

The target region (120) indicated by dashed lines indicates that waves may be received from the chemicals (100) to be identified and from the background (130). Additionally, the size, shape and resolution of the target region (120) may be altered to suit measurement conditions. According to one embodiment, the CIS system (110) of FIG. 1 may be configured to identify the chemicals (100) in the target region (120) by detecting waves entering the system (110) without emitting any radiation.

Figure 2:
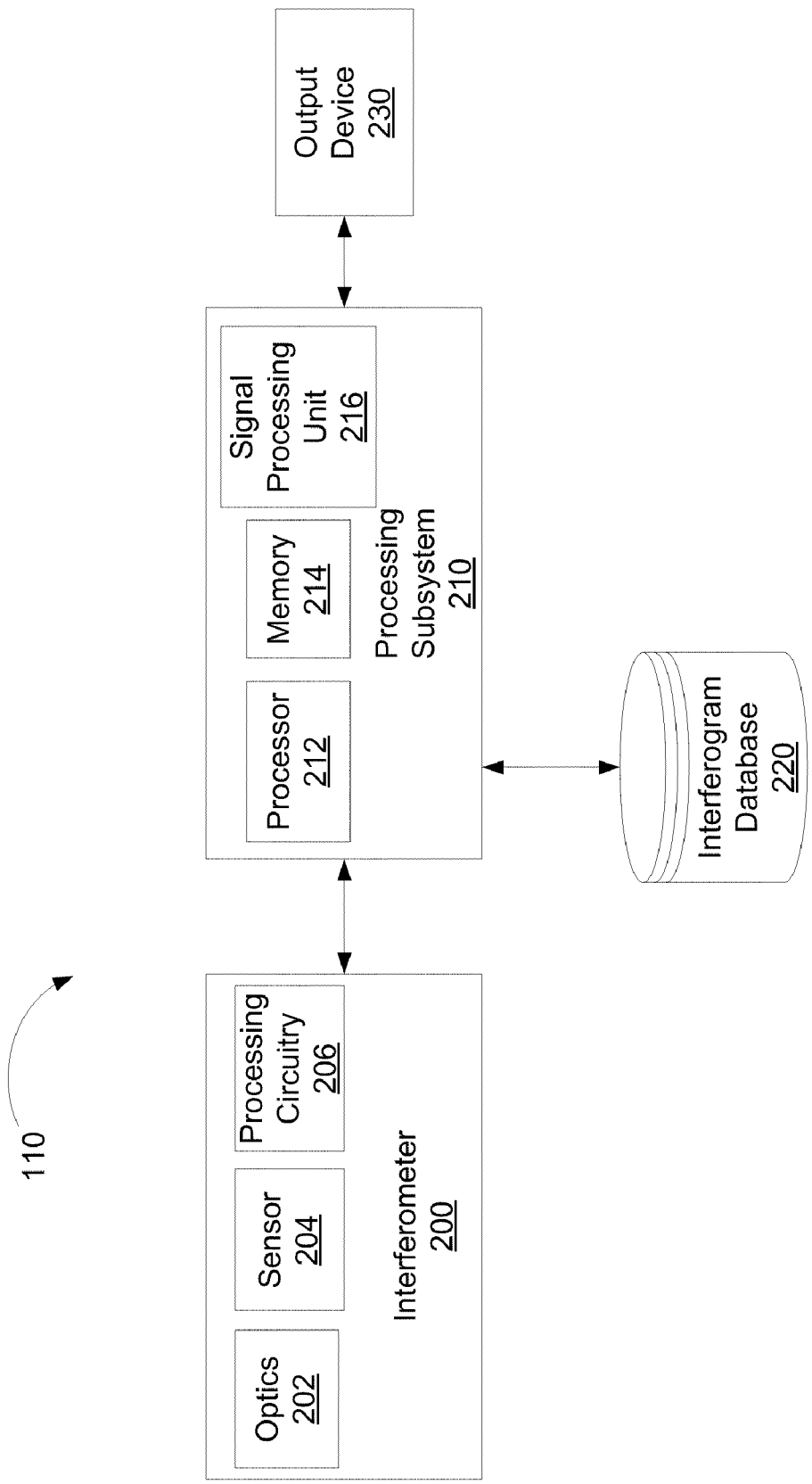
FIG. 2 is a block diagram illustrating components of a comparative interferogram spectrometry system, according to one exemplary embodiment.

The block diagram of FIG. 2 introduces the components of an exemplary CIS system. An interferometer (200) receives incident waves and generates interferograms from the waves received. According to one embodiment, the interferometer (200) may be configured to receive infrared (IR) light or other incident waves. A processing subsystem (210) receives the interferogram data and may compensate for background noise, instrument error, and other factors. The processing subsystem (210) then compares the received interferograms with reference interferograms recorded in an interferogram database (220) to identify the chemicals detected. The results may then be presented with one or more output devices (230).

The interferometer (200) includes optics (202) to generate interferograms from incident light. According to one embodiment, the optics (202) may be configured to generate interferograms from infrared (IR) light. According to another embodiment, the optics (202) may be configured to generate interferograms from other electromagnetic radiation including, but not limited to, terahertz waves, near infrared light, visible light, ultraviolet light, and x-rays. Optics may include, but are not limited to, lenses, mirrors, prisms, windows, shutters, filters, beam splitters, collimators, and other optical instruments. Lenses and other optics may include quartz, calcium fluoride ($CaF_2$), germanium, silicon, polyethylene Fresnel lenses, or other materials, and mirrors may be made of aluminum, gold, or other reflective materials. According to one embodiment, the optics (202) may be selected and configured for best performance with a specific range of wavelengths of radiation, such as infrared light between 750 nm and 1 mm, 3 µm and 8 µm, or other wavelength range.

Figure 3:
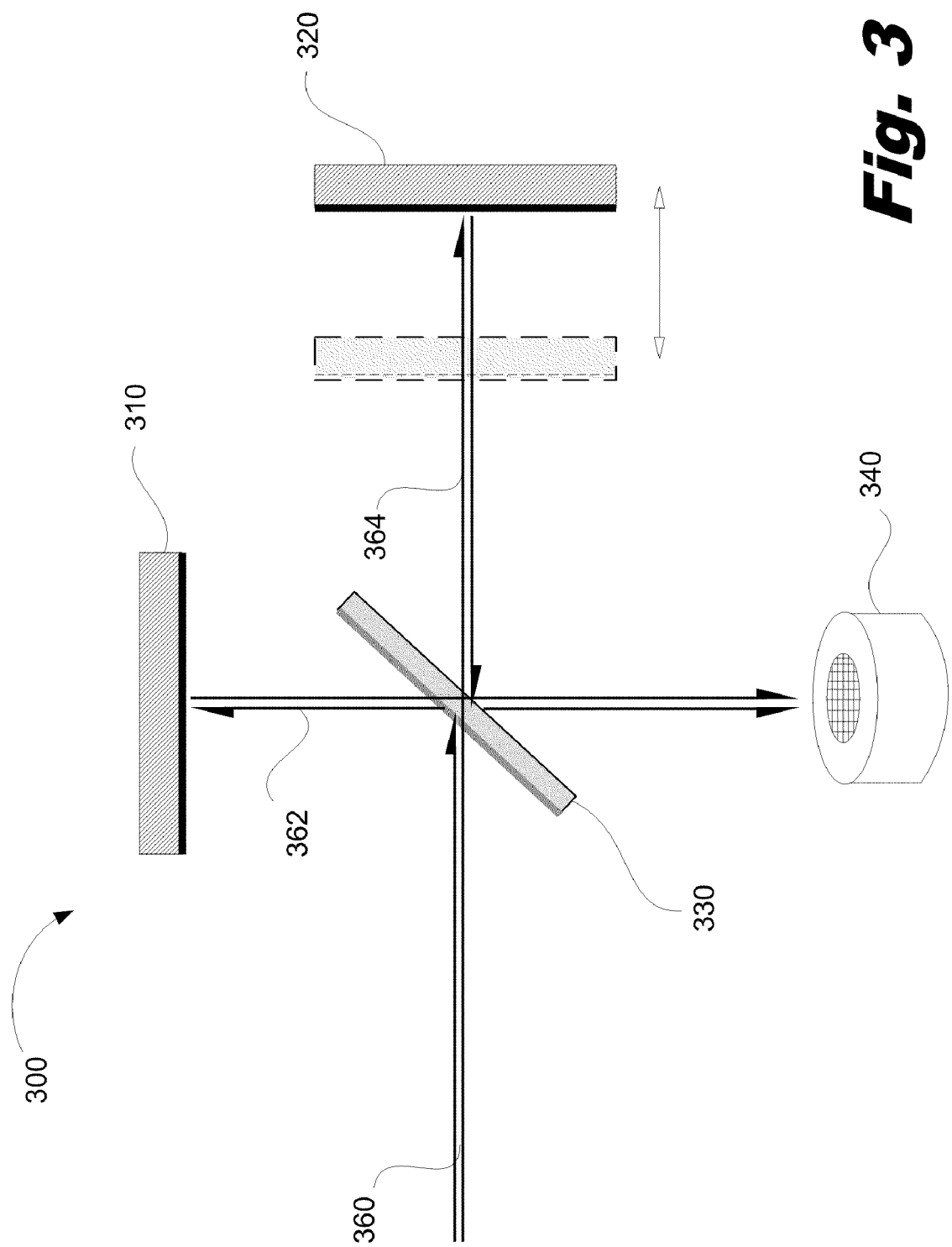
FIG. 3 is a schematic illustrating an arrangement of interferometer optics, according to one exemplary embodiment.

An exemplary configuration of interferometer optics (202) is illustrated in FIG. 3. According to the optical configuration (300) of FIG. 3, incident waves (360) enter the interferometer (200) and are divided by a beam splitter (330). Essentially half of the waves (362) may be reflected while the remaining waves (364) are transmitted through the beam splitter (330). Initially reflected waves (362) reflect again from a fixed mirror (310) and are then transmitted to the detector (340) via a first optical path. The initially transmitted waves (364) follow a second path and are reflected by a moving mirror (320) to the detector (340) along a second optical path. As the moving mirror (320) moves away from the beam splitter (330), the second optical path length (364) increases. The variation in distance between the two paths causes interference patterns to be generated at the detector (340), similar to those shown in FIGS. 4 and 5.

A variety of additional optical configurations (300) are compatible with the interferometer (200, FIG. 2) in the CIS system (110, FIG. 2). The arrangement of optics (300) in FIG. 3 is intended to be purely illustrative and not restrictive in any way.

Continuing with FIG. 2, interferogram data generated by the optics (202) is detected by a sensor (204). Sensors (204) may include, but are not limited to, photoconductive detectors, photovoltaic detectors, pyroelectric detectors, and photoacoustic detectors, photodiodes, and phototransistors. A sensor (204) may include variety of materials, such as deuterated triglycine sulfate (DTGS), deuterated lanthanum triglycine sulfate (DLATGS), ceramic lead zirconate titanate (PZT), indium antimonide (InSb), indium arsenide (InAs), indium gallium arsenide (InGaAs), lead sulfide (PbS), lead selenide (PbSe), lithium tantalate ($LiTaO_3$), silicon (Si), mercury zinc telluride (HgZnTe, MZT), mercury cadmium telluride (HgCdTe, MCT), and other IR-sensitive substances. Some detectors, such as those containing HgCdTe, may be cooled using liquid nitrogen or other coolant systems. Two or more IR sensitive materials may be combined in a detector for improved sensitivity over a wider range of wavelengths.

A variety of detectors may be configured for use with an interferometer (200). For example, one sensor (204) may exhibit excellent signal to noise characteristics but require a large cooling system, while a smaller, less sensitive sensor (204) may still be adequate for some applications. As with the optics (202), the sensor (204) may be selected or tuned for a range of wavelengths suitable for the chemicals to be detected.

A variety of sensor (204) configurations may be used to maximize the effective range, precision, signal to noise ratio, detectable area, and other characteristics of the CIS system (110). According to one embodiment, one or more sensors (204) may be configured to scan an area. At various measurement points, the interferometer (200) may employ continuous scan or step-scan data acquisition methods. According to another embodiment, multiple sensors (204) may be arranged in a linear or two-dimensional array to improve resolution and decrease data acquisition time.

Processing circuitry (206), including amplifiers, filters, and other devices, may be used to improve the quality of signals generated by the sensor elements (204). Amplifiers and other circuit elements may be designed to take into account temperature changes of the interferometer (200), the electrical properties of the sensors (204), and other characteristics of the CIS system (110).

Interferogram data generated by the interferometer (200) may be transmitted to the processing subsystem (210) through a variety of transmission media. Transmission media may include, but are not limited to, coaxial cables, fiber optics, and wires, including the wires that comprise a system bus coupled to a processor of a computer. Transmission media may also include or convey acoustic waves, light waves, and electromagnetic emissions, such as those generated during radio frequency (RF) and infrared (IR) data communications.

As shown in FIG. 2, the processing subsystem (210) may include one or more processors, such as a processor (212) configured to control the operations of the processing subsystem (210). The processor (212) may be configured to execute commands to perform tasks such as receive and transmit data, generate output data, compare an interferogram to records in an interferogram database (220), and other functions which will be described in greater detail herein.

A signal processing unit (216) may assist one or more processors (212) in the processing of interferogram data. According to one embodiment, the signal processing system (210) may apply one or more filters, scale received data, calculate background levels, determine validity of received data, compare interferogram data, and perform other processing of interferogram data.

The processing subsystem (210) may also include memory (214). Memory (214) may include, but is not limited to, FLASH memory, random access memory (RAM), dynamic RAM (DRAM), optical or magnetic disks, and other volatile or non-volatile memory. Memory (214) may store applications, such as analysis software, as well as received interferogram data, analysis results, and other data or commands.

According to one embodiment, an interferogram database (220) may be linked to the processing subsystem (210) through one or more transmission media. Additionally or alternately, an interferogram database (220) may be integrated into a processing subsystem (210). For example, the interferogram database (220) may include lists, objects, trees, graphs, tables, arrays, records, or other data structures in memory (214). An interferogram database (220) may be implemented in memory (214) associated with one or more processors (212) and/or signal processing units (216) to allow interferogram data to be stored or retrieved.

An interferogram database (220) may store interferograms that may be compared to interferograms generated by the interferometer (200). The interferogram database (220) may also store distinguishing interferogram features or fringe ranges that may facilitate identification of chemicals. Since information about the IR frequencies received is included in multiple fringes, the interferograms stored in the interferogram database contain more points of comparison to received data than spectral plots. Since detection, identification, and all other processing may be completed in the interferogram domain, no spectral data is necessary.

Although spectral data is not necessary, some embodiments of the interferogram database (220) or processing subsystem (110) may include spectral data for analysis or display. According to one embodiment, spectral data may provide a useful visual representation of the analysis results. A spectral representation of the interferogram data analyzed may be provided for a user to view even though analysis is performed in the interferogram domain. According to another embodiment, chemical analysis may be performed in the spectral domain and the interferogram domain simultaneously. In some embodiments, the use of both spectral and interferogram approaches may improve the accuracy, speed, or other aspects of interferogram processing.

According to another embodiment, the interferograms stored in the interferogram database (220) may be generated in ambient conditions. Interferograms generated in controlled laboratory settings may not be adequately comparable to interferograms generated in ambient conditions. Reference interferogram data may also represent the accumulation or integration of multiple interferograms as a composite interferogram. Reference interferograms may be generated with a single chemical or multiple chemicals of interest, and may be stored with or without background data present.

According to one embodiment, the interferogram database (220) may include interferograms and/or composite interferograms matched specifically to the interferometer configuration used to generate the data interferograms. According to another embodiment, a reference library of interferograms may be generated using the specific hardware elements of the interferometer to be used for remote chemical identification. Since measurements may vary significantly between identically configured interferometers, reference libraries generated for individual instruments may improve analysis sensitivity.

One or more output devices (230) may be attached through appropriate transmission media to the processing subsystem (210) to present the results of the chemical identification process or other data generated. Spectral data, interferogram data, visual data, system messages, and other information may also be presented. According to one embodiment, an output device may include a screen such as a computer monitor, liquid crystal display (LCD), a cathode ray tube (CRT), or other visual display. Additionally, a printer, speaker, or other output device may be attached to present information to a user of the CIS system (110). Specifically, with a speaker, chemical identification data or warnings can be presented audibly.

Figure 4:
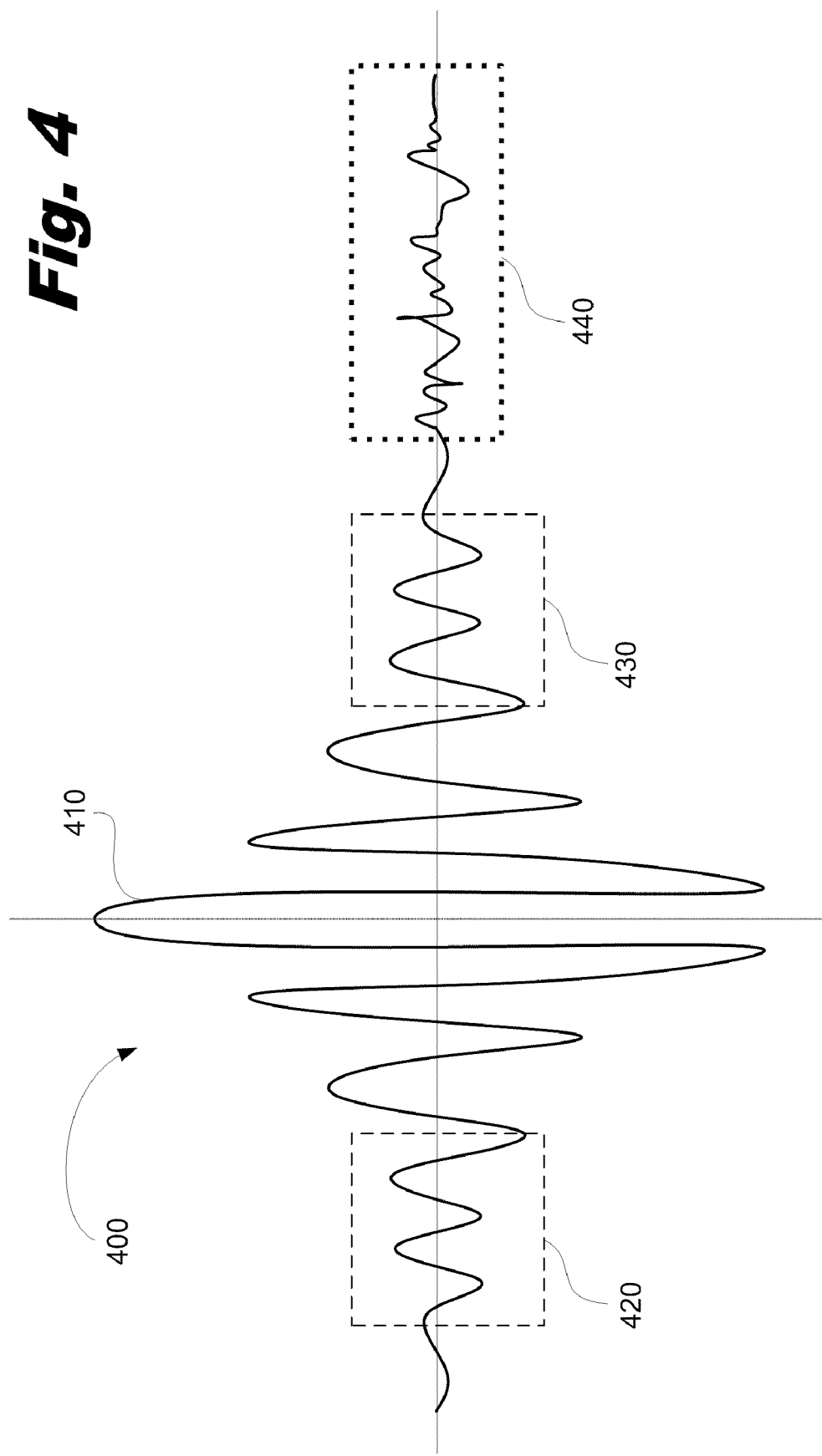
FIG. 4 illustrates an interferogram generated by a comparative interferogram spectrometry system, according to one exemplary embodiment.

An exemplary interferogram is illustrated in FIG. 4, according to one embodiment. The interferogram (400) represents the constructive and destructive interference of many incident waves. According to the embodiment of FIG. 4, the interferogram represents the combined intensity of incident IR waves received on the vertical axis versus time on the horizontal axis.

While each IR frequency is represented at a single point on a spectral plot, information about each IR frequency present will be included in multiple fringes of an interferogram (400). For each feature of interest in the spectral domain, there are many corresponding fringes in the interferogram domain that may be used to identify a chemical.

As illustrated in FIG. 4, a valid interferogram (400) may be essentially symmetrical about a central fringe (410). Corresponding interferogram sections (420, 430) may be compared to determine if symmetry is acceptable and thus if an interferogram (400) contains useful data. Interferogram features that exist in only one half of an interferogram are generally the result of noise and not actual chemicals in the monitored area.

Figure 5:
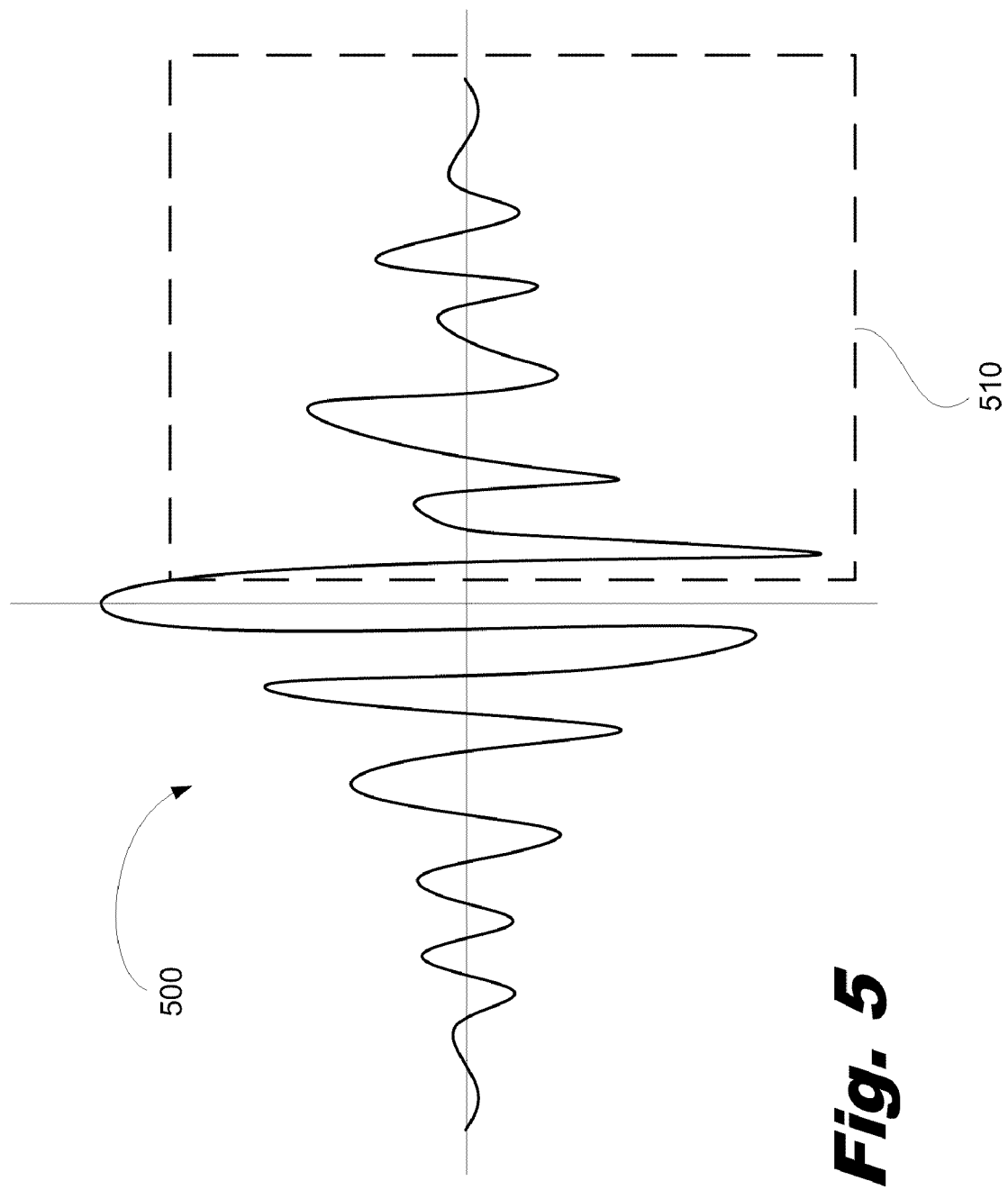
FIG. 5 illustrates another interferogram generated by a comparative interferogram spectrometry system, according to one exemplary embodiment.

An interferogram (500) of questionable validity is shown in FIG. 5. As shown in FIG. 5, the right side (510) of the interferogram (500) does not correspond with the left side of the interferogram (500). Asymmetry in an interferogram (500) may be caused by noise, rapidly changing backgrounds, instrument error, quickly changing temperatures, and other conditions. According to one embodiment, the interferometer (200, FIG. 2) or processing subsystem (210, FIG. 2) may identify and quantify instrument error. In such a case, the interferogram (500) can be validated.

In many interferometers (100), instrument error may cause systematic shifting, stretching, asymmetries, and other distortions in measured interferograms. According to one embodiment, the processing subsystem (210) may compensate for small, consistent distortions in interferograms received. Additionally, the processing subsystem (210) may calculate the severity of asymmetries in received interferograms and compare the calculated asymmetry level to an asymmetry threshold. Interferograms with asymmetry exceeding a threshold level may be ignored as invalid data. To determine the degree of asymmetry present in an interferogram, the processing subsystem (210, FIG. 2) may calculate the ratio between the accumulated intensity of each half of an interferogram, the ratio of intensities of corresponding sections, or the ratio of area or intensity of individual corresponding fringes. The placement of interference fringes, maximum and minimum intensities, and other interferogram characteristics may also be compared to determine asymmetry and compensate for instrument error.

Returning to FIG. 4, signal strength and interferogram intensity generally decrease as distance from the central fringe (410) increases. Noise contributions become an increasingly greater proportion of the interferogram until the data is no longer indicative of the chemicals present. According to one embodiment, the processing subsystem (210; FIG. 2) may limit the effect of noise (440) by excluding noisy interferogram regions from analysis. The processing subsystem (210; FIG. 2) may apply the interferogram partitioning principle (IPP) to separate an interferogram into various sections to reduce noise, highlight critical interferogram features, and increase analysis speed.

IPP teaches that individual fringes and sections of an interferogram may be analyzed independently. The ability to partition and selectively analyze interferogram fringes is a significant advantage over spectral domain analysis. If only a portion of an interferogram is transformed to the spectral domain, the resulting spectral plot usually contains significant artifacts and distortions. Generally, spectral approaches must transform an interferogram as a whole, including all noise in the interferogram. However, the CIS system (110; FIG. 2) may use IPP to exclude noisy sections of an interferogram without any disadvantages in the analysis. According to one embodiment, a threshold fringe index may be determined so that interferogram fringes beyond the threshold are excluded from analysis, eliminating the noise from interferogram based analysis.

The fringes used for chemical identification in the interferogram domain may be selected from any section or sections of an interferogram. For example, one CIS embodiment may track noise levels at various fringes counting away from a center fringe (410; FIG. 4). The CIS system (110; FIG. 2) may determine that an interferogram (400) contains useful data up to fringe 20 and also at fringes 33, 38 and 45. Other fringes may be ignored to reduce the noise introduced into the analysis. The selected fringes may then be compared to corresponding fringes of interferograms in an interferogram database (220).

Many relationships between fringes and sections of an interferogram may indicate the identity of compounds detected and other measurement properties. According to one embodiment, interferograms may be partitioned and compared according to fringe count, fringe placement, intensity, signal to noise ratio, shape, width, area, and other measures. For example, partitions according to fringe index and fringe position may be used to characterize noise and determine background levels as described above. Additionally, partitions determined by fringe intensity may be compared to identify specific chemical signatures in an interferogram (400).

Partitioning of interferograms using IPP may increase the accuracy of chemical identification. According to one embodiment, the processing subsystem (210; FIG. 2) may partition an interferogram according to the features and fringes most likely to contain information regarding a chemical species of interest. By comparing the most relevant sections of a received interferogram and reference interferograms, the CIS system (110; FIG. 2) may increase sensitivity to specific chemicals and increase analysis speed.

Multiple chemical signatures may be extracted from an interferogram to identify the components and relative composition of mixtures of various chemical compounds. When multiple chemicals are present, the contribution of each chemical is proportional to the partial pressure of each chemical in the target region. The relative intensity of each chemical signature in an interferogram may be determined by comparison to reference interferograms in the interferogram database (220; FIG. 2). According to one embodiment, the relative intensity of each chemical signature may indicate the relative quantity of that chemical in the target region. According to one embodiment, quantitative results are presented as percent composition of various chemicals present. Individual fringes, groups or ranges of fringes, entire interferograms, ratio interferograms, and other interferogram characteristics may be used to determine the appropriate weighting of chemical signatures to determine the relative composition of a mixture of chemicals.

Interferogram data (400) may represent the composite of multiple sensor readings integrated over a period of time and/or over multiple target areas. Integration of multiple measurements allows small, consistent signals to accumulate and emerge from noise. The integration of many readings reduces many types of noise while accentuating valid data. This can improve the signal to noise ratio of the resulting interferogram. According to one embodiment, the intensities of multiple interferograms are integrated at each corresponding data point. The result of the integrations is a composite interferogram reflecting information from each individual interferogram. According to another embodiment, a composite interferogram may also be scaled or normalized after integration. Additional embodiments may generate composite interferograms using processes including, but not limited to, summation, integration, piecewise construction, ratio of interferograms, and additional transforms and mathematical operations.

To compensate for changing background conditions and varying signal intensities, interferogram data may be normalized before integration or comparison to reference interferograms. According to one embodiment, interferogram data may be scaled so that the center fringe (410; FIG. 4) of each interferogram has equal intensity. Since the center fringe includes contributions from all frequencies of IR waves received, the intensity of the center fringe (410; FIG. 4) closely approximates the total amount of IR waves received. Unfortunately, interferograms with large variation in maximum intensities cannot be easily compared. Scaling or normalizing the interferograms to have a common maximum intensity enables more accurate comparisons.

A background level or threshold may be determined to accurately detect chemicals introduced into a target area. FIGS. 6A through 6E illustrate various exemplary embodiments of interferograms used to determine background intensity levels.

Figure 6A:
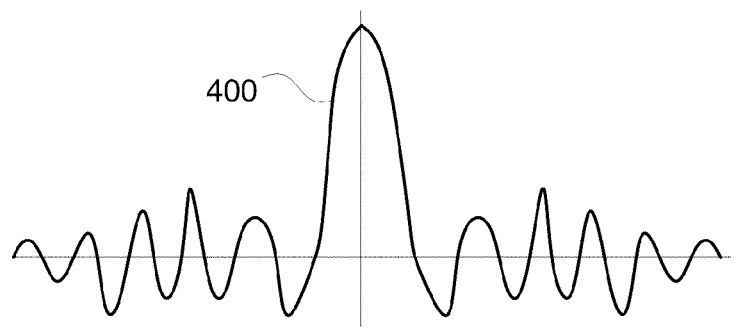
FIGS. 6A through 6E illustrate various elements of background processing in a comparative interferogram spectrometry system, according to various exemplary embodiments.

FIG. 6A illustrates an exemplary interferogram (400) representing a measurement of ambient background noise. The interferogram (400) shown represents a measurement generated while no chemicals of interest are present in an appreciable quantity or concentration. The interferogram (400) may represent a single interferogram measurement or may represent a composite interferogram, such as the integration of multiple measurements over a period of time and/or over multiple target areas.

Figure 6B:
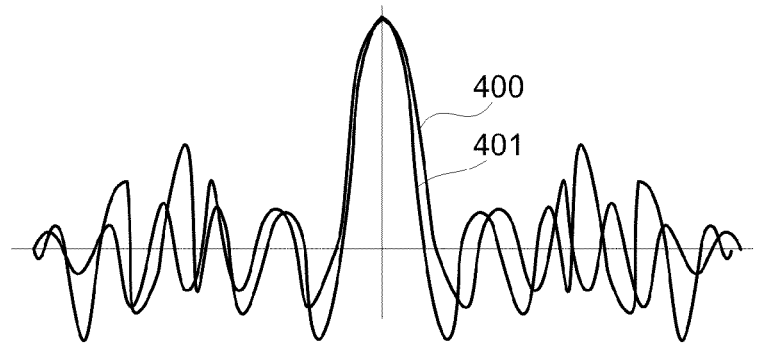

FIG. 6B illustrates the interferogram (400) of FIG. 6A with a second interferogram (401). Both interferograms (400, 401) represent background noise measurements, but have somewhat different fringe placement and intensities. Since noise levels and background conditions often fluctuate, the comparison of multiple interferograms and measurements can result in a more accurate background determination than a single measurement. As illustrated, the two interferograms (400, 401) are scaled so that the central fringes have equal intensity. According to one embodiment, each interferogram (400, 401) may be a composite interferogram. For example, each interferogram (400, 401) may represent the integration of 10 background measurements.

The two background interferograms (400, 401) selected represent noise levels at successive periods of time. For example, the overall noise level may be determined using a composite interferogram representing the most recent 10 measurements and another composite interferogram representing the 10 earlier measurements. The comparison of background interferograms from multiple time periods can enable the CIS system (110; FIG. 2) to determine accurate noise levels when background conditions are changing. According to another embodiment, the background interferograms may represent conditions at multiple spatial locations, measured during the same time period or different time periods. For example, analyzing background interferograms measured at adjacent sections of the target region may minimize background level inconsistencies across the target region. Such comparisons may result in a "sliding window" of spatial and/or temporal comparisons to generate an accurate dynamic background level.

Figure 6C:
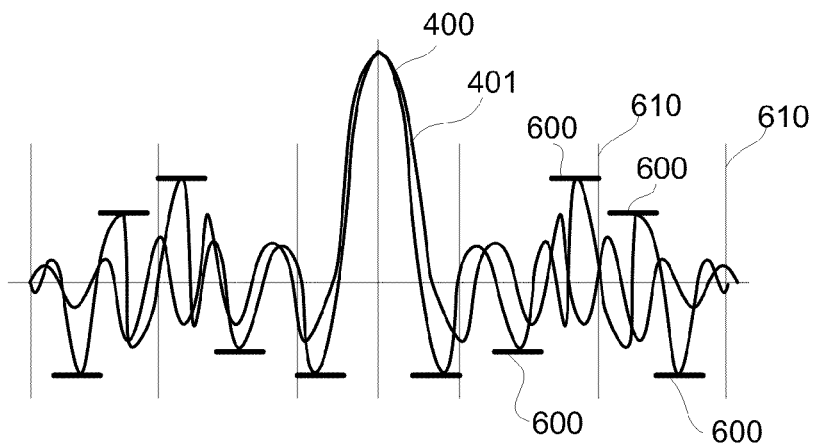

As illustrated in FIG. 6C, both interferograms (400, 401) of FIG. 6B have been partitioned into multiple regions, indicated by vertical dividers (610). According to one embodiment, the partitions may be symmetrical about the central fringes of the interferograms (400, 401), as shown. However, since noise may be inherently asymmetrical, partitions are not required to be symmetrically placed. Partition sizes and locations may be determined based on a number of factors, including, but not limited to, properties of chemicals of interest, interferogram intensity levels, fringe count, fringe location, and fringe area.

Figure 6D:
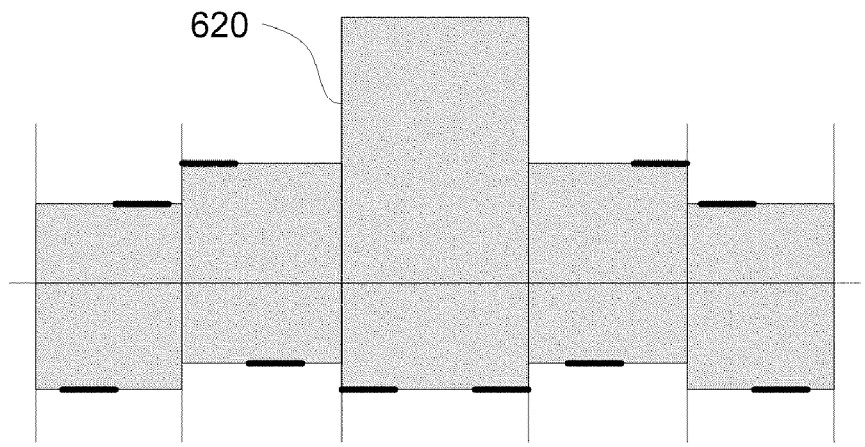

According to the embodiment of FIG. 6C, a maximum and minimum intensity within each partition is determined, as illustrated by horizontal markers (600). According to one embodiment, these local maximum and minimum values may be used to set a background noise level within that partition. FIG. 6D illustrates noise ranges (620) derived from the local maximum and minimum values from FIG. 6C.

According to another embodiment, the background level may be set as the absolute value of the noise interferogram intensity within each partition. According to yet another embodiment, the background noise level may include an additional margin, such as the maximum intensity plus the difference between the absolute value of two interferograms within a partition. A variety of additional methods may be employed to determine accurate background noise levels (620), and the method of determination may vary according to background conditions and the configuration of the CIS system (110; FIG. 2).

Figure 6E:
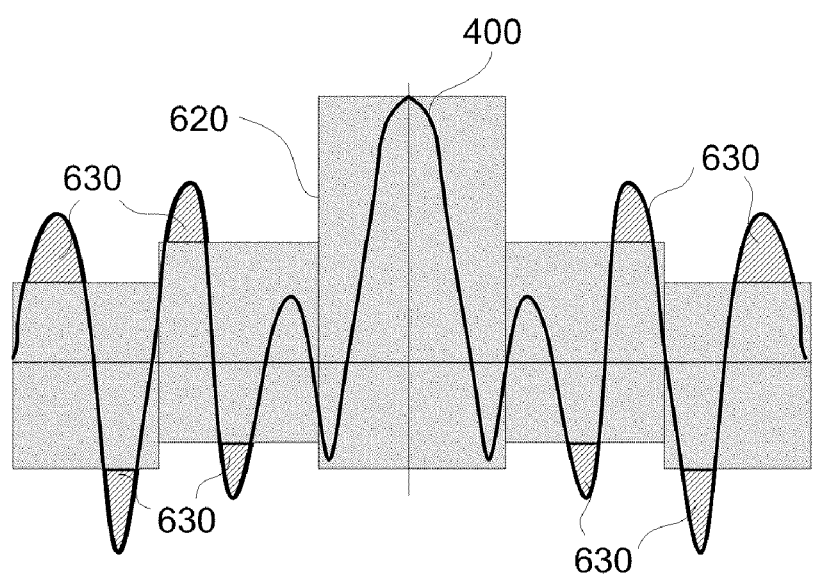

According to one embodiment, the background levels (620) of FIG. 6D may be used to detect significant changes in chemical content in the target region (120; FIG. 1) of the CIS system (110; FIG. 2). FIG. 6E illustrates a comparison between a measured interferogram (400) and background noise levels (620). According to the embodiment of FIG. 6E, the interferogram (400) has been scaled for accurate comparison to the background levels (620). As shown, the interferogram (400) falls outside the noise levels (620) in certain partitions. According to one embodiment, fringes (630) extending outside the noise levels (620) may indicate the presence of a previously absent chemical in the measurement region. According to another embodiment, interferogram (400) may indicate the presence of a new chemical only when the interferogram fringes (630) exceed the noise levels by a predetermined percentage or threshold. The processing subsystem (210; FIG. 2) may consider the difference between the interferogram intensity and the background levels (620), the area outside the background levels (620), and other interferogram (400) properties to determine that an interferogram (400) represents the addition of a new chemical into the target region (120; FIG. 1).

According to another embodiment, chemicals in the target region (120; FIG. 1) may be detected by comparing measured interferograms (400) to a composite background interferogram (400). For example, a number of background interferograms may be integrated and scaled to represent average background levels. The composite background interferogram may be updated to reflect the most recent background measurements, such as the last 100 background measurements. New interferogram (400) measurements may be compared to the background composite interferogram using a ratio of the new measurement with respect to the background. By taking the ratio, noise in the resulting ratio interferogram tends to scale to a value of 1 while interferogram features due to actual chemicals of interest maintain greater amplitudes. According to another embodiment, multiple measurements may be accumulated so that the ratio of a composite measurement interferogram and a composite background interferogram is calculated.

After chemicals of interest have been detected, they may be compared to reference interferograms in the interferogram database (220; FIG. 2). Received interferograms may be scaled, checked for symmetry, accumulated to form a composite interferogram, and/or checked for symmetry and other quality measures before comparison to known interferogram chemical signatures. Measurement interferograms may be further processed, including taking a ratio with a background interferogram, as described above. Processed interferograms are then compared to interferograms in the interferogram database (220; FIG. 2). According to one embodiment, individual fringes of the reference and measurement interferograms may be compared. According to another embodiment, multiple fringes and ranges of fringes may be compared as a group to identify chemicals detected in the interferograms. When a measured interferogram and a reference interferogram are found to contain substantially similar characteristics, the chemical associated with the reference interferogram is considered to be present in the target region.

As described above, multiple reference interferograms, each representing a single chemical, may be compared to a measurement interferogram to determine the identity of multiple chemicals and relative quantity of each chemical. According to one embodiment, multiple interferogram signatures may be weighted and combined as described above.

Figure 7:
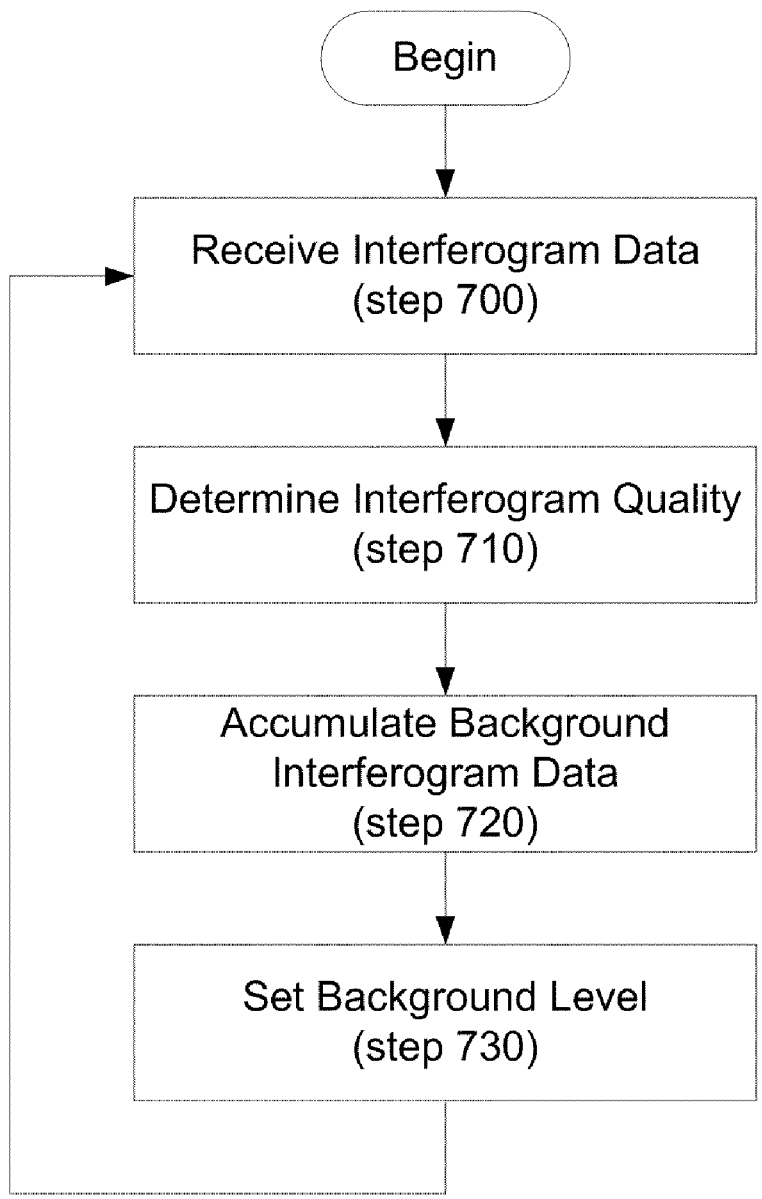
FIG. 7 is a flowchart illustrating a method for determining a background noise level, according to one exemplary embodiment.

FIG. 7 illustrates the steps of an exemplary method for determining a background noise level for a comparative interferogram spectrometry (CIS) system in ambient conditions, according to one embodiment. The method described may be applied to generate a background level for the entire target region or a portion of the target region, such as a pixel or group of pixels within a measured area.

In step 700, one or more interferograms describing background noise are received. According to one embodiment, interferograms may be received from an interferometer measuring incident IR waves from a target region. Interferograms may also be received through a network, local storage, removable media, and other sources.

Next, the quality of a received interferogram is determined (step 710). According to one embodiment, various interferogram characteristics may be considered, including, but not limited to, interferogram symmetry, fringe placement, fringe shape, fringe area, and ratios of these characteristics. Interferogram quality measures may be compared to predetermined or dynamic thresholds to determine if an interferogram is valid. Analysis of an interferogram may also include adjusting received data to compensate for instrument error and adjusting quality thresholds for measurement conditions. Interferograms that are found to be invalid are discarded unless corrections can be made, and valid interferograms are retained for further analysis. A series of interferograms below quality thresholds may indicate that the interferometer or other component of the CIS system (110) has failed.

Valid background interferograms are then accumulated to create one or more composite interferograms (step 720). As previously mentioned, interferograms may be scaled to appropriate intensity levels before composite interferograms are formed. Additionally, interferograms including chemicals signatures outside of background levels may be excluded from accumulation or integration. Composite background interferograms may include data from measurements from multiple spatial sections of a target region and time periods, as mentioned previously.

Composite background interferograms are then used to set a background noise level (step 730). According to one embodiment, multiple composite background interferograms may be compared to determine appropriate noise levels. One embodiment may compare the previous two composite interferograms generated, for example, to determine a dynamic background based on the most recent background measurements. Background levels may be represented as a set of noise thresholds, a composite noise interferogram, of other representation. According to one embodiment, the exemplary method of FIG. 7 may repeat as frequently as desired, beginning at step 700, to determine an updated background level.

Figure 8:
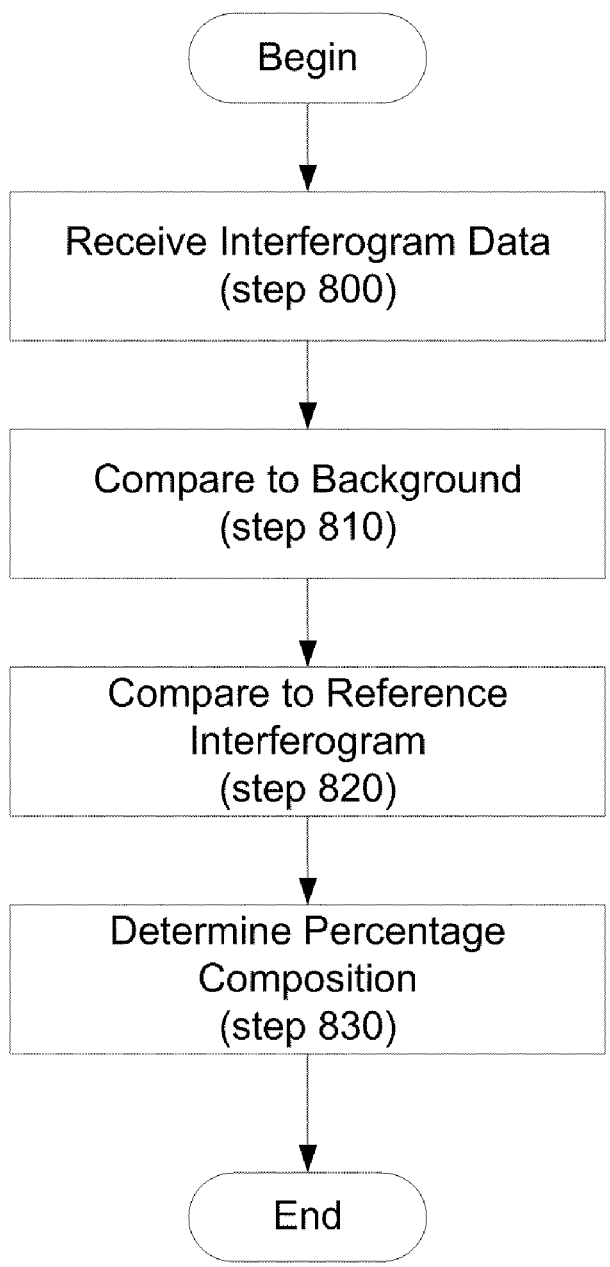
FIG. 8 is a flowchart illustrating a method for identifying chemicals using interferogram data, according to one exemplary embodiment.

FIG. 8 is a flowchart illustrating a method of identifying chemicals based on interferogram signatures, according to one exemplary embodiment.

In step 800, one or more measurement interferograms are received. According to one embodiment, interferograms may be received from an interferometer measuring incident IR waves from a target region. Interferograms may also be received through a network, local storage, removable media, and other sources.

According to one embodiment, interferograms may be filtered or selected prior to step 800 so that only valid measurements are received and processed using the method of FIG. 8. According to another embodiment, step 800 may include receiving valid and invalid interferograms, and step 800 may additionally determine the quality of received interferograms, as described in step 710 of FIG. 7. Interferograms that are received and determined to be valid in step 800 may be further processed while invalid interferograms may be discarded.

Received interferograms are then compared to background noise levels (step 810). According to one embodiment, a ratio interferogram may be generated by dividing received interferograms by a composite background interferogram. Noise contributions in the received interferogram are reduced to values close to one, while significant chemical signatures remain at greater amplitudes. Signal intensities of the ratio interferogram above a threshold may indicate the presence of chemicals other than those in the background. A section of the target region, such as a set of pixels with fringe intensity above a background level, may be designated for further processing and identification.

According to another embodiment, multiple received interferograms are accumulated and integrated to generate a composite interferogram, as mentioned above. The ratio interferogram is then generated from the composite measurement interferogram and the composite background interferogram. Using composite interferograms spanning multiple measurements, the signal to noise ratio can be significantly increased. Alternately, individual interferogram measurements may be processed in some embodiments.

Ratio interferogram and/or measurement interferograms containing chemical signatures are then compared to reference interferograms to identify the chemicals indicated by the interferograms (step 820). The features of the ratio interferograms, measurement interferograms, and various reference interferograms may be compared in any of the ways described above, including, but not limited to, by fringe intensity, placement, shape, and area. As mentioned previously, various partitions of the interferograms may be compared individually. Sections of the ratio and measurement interferograms with high noise levels may be excluded from comparison according to the interferogram partitioning principle. Interferograms with features that correlate with those of a reference interferogram are considered to indicate the presence of the chemical or chemicals used to generate the reference interferogram.

For example, one reference interferogram generated from a particular chemical may contain significant intensity at fringes 13 and 17, where the intensity at fringe 17 is approximately double the intensity at fringe 13. Ratio and/or measurement interferograms which contain these or substantially similar characteristics may be considered to have been generated from the same chemical as the reference interferogram.

According to another embodiment, a user of the CIS system (110) may be notified during or subsequent to step 820 if no reference interferogram matches the characteristics of the interferogram being processed. Additionally or alternately, the characteristics of the unmatched interferogram may be recorded to update the database of reference interferograms for future comparisons. According to one embodiment, measurement and ratio interferograms may be analyzed in step 830 to determine the relative composition of the chemicals identified in step 820. Generally, determination of the percentage composition of chemicals identified is performed when at least two chemicals are identified in step 820. Quantitative analysis, including percentage composition calculations, may be performed in any of the ways described above, including, but not limited to, analysis by partial pressures, comparison of intensity ratios of individual chemical signatures, and comparison to multiple reference interferograms.

The preceding description has been presented only to illustrate and describe various embodiments of the principles described herein. It is not intended to be exhaustive or to limit the principles described herein to any precise form disclosed. Many modifications and variations are possible in light of the above teaching.

What is claimed is:

1. A method for determining a background noise level, said method comprising:
   receiving interferogram data;
   determining at least one measure of interferogram quality;
   generating a background noise level based on said interferogram data and at least one measure of interferogram quality.

2. The method of claim 1, further comprising accumulating said received interferogram data.

3. The method of claim 2, wherein said accumulating step includes generating at least one composite interferogram.

4. The method of claim 2, wherein said accumulating step excludes said received interferogram data determined to have a quality less than a threshold quality.

5. The method of claim 1, wherein said background noise level is represented as a set of threshold interferogram intensity values.

6. The method of claim 1, wherein said background noise level is represented as a composite interferogram.

7. The method of claim 1, wherein said generating step includes comparing received interferograms from at least two time periods.

8. The method of claim 1, wherein said generating step includes comparing received interferograms from at least two spatial locations.

9. The method of claim 1, wherein said method is repeated to determine A dynamic background noise level.

10. The method of claim 1, further comprising:
partitioning at least one region of an interferogram from said interferogram data; and
excluding, from an accumulation of interferogram data, at least one portioned region of said interferogram determined to have a quality less than a threshold quality.

11. A method for identifying at least one chemical from sample interferogram data, said method comprising:
receiving interferogram data;
determining at least one measure of interferogram quality;
generating a background noise level based on said interferogram data and at least one measure of interferogram quality;
receiving sample interferogram data from a material under study;
comparing said sample interferogram data to said background noise level; and
comparing said sample interferogram data to at least one reference interferogram to identify at least one chemical indicated by said interferogram data.

12. The method of claim 11, wherein said background noise level comprises a composite interferogram.

13. The method of claim 11, wherein said comparing to a background noise level step comprises generating a ratio interferogram between said received interferogram data and said background noise level.

14. The method of claim 13, wherein said ratio interferogram is compared to said at least one reference interferogram.

15. The method of claim 11, further comprising determining at least one quality measure of said sample interferogram data.

16. The method of claim 15, further comprising excluding sample interferogram data determined to have a quality measure less than a threshold quality measure from further comparisons.

17. The method of claim 11, further comprising determining a percent composition of chemicals identified in said comparing to at least one reference interferogram.

18. The method of claim 11, wherein said comparing to a background noise level step comprises determining if an intensity of at least one fringe of said received interferogram data exceeds a background intensity measure of said background noise level.

19. The method of claim 11, wherein said comparing to at least one reference interferogram step comprises comparing selected partitions of said received interferogram data and said at least one reference interferogram.

20. The method of claim 19, wherein said partitions are selected according to at least one of fringe position, fringe intensity, fringe shape, fringe intensity, fringe area, and background noise level.

21. The method of claim 20, wherein said partitions exclude at least a portion of noise from said interferogram data.

* * * * *